(12) United States Patent
Potvin et al.

(10) Patent No.: US 11,494,831 B2
(45) Date of Patent: Nov. 8, 2022

(54) SYSTEM AND METHOD OF PROVIDING CUSTOMER ID SERVICE WITH DATA SKEW REMOVAL

(71) Applicant: SHOPIFY INC., Ottawa (CA)

(72) Inventors: Pascal Potvin, Laval (CA); Youcef Msaid, Montreal (CA)

(73) Assignee: SHOPIFY INC., Ottawa (CA)

( * ) Notice: Subject to any disclaimer, the term of this patent is extended or adjusted under 35 U.S.C. 154(b) by 141 days.

(21) Appl. No.: 16/437,028

(22) Filed: Jun. 11, 2019

(65) Prior Publication Data

US 2020/0394703 A1    Dec. 17, 2020

(51) Int. Cl.
| | |
|---|---|
| G06Q 30/06 | (2012.01) |
| G06Q 20/40 | (2012.01) |
| H04L 67/306 | (2022.01) |
| H04L 67/50 | (2022.01) |

(52) U.S. Cl.
CPC ..... *G06Q 30/0641* (2013.01); *G06Q 20/4014* (2013.01); *H04L 67/306* (2013.01); *H04L 67/535* (2022.05)

(58) Field of Classification Search
CPC .............. G06Q 30/0641; G06Q 30/06; G06Q 30/0601–0645; G06Q 20/385; G06Q 20/42; G06Q 20/4014; H04L 67/306; H04L 67/535
USPC ................................................ 705/26.1–27.2
See application file for complete search history.

(56) References Cited

U.S. PATENT DOCUMENTS

| | | | | |
|---|---|---|---|---|
| 9,501,662 | B2* | 11/2016 | Rosner | G06F 21/6254 |
| 9,501,793 | B1* | 11/2016 | Edelman | G06K 7/10366 |
| 2002/0165755 | A1* | 11/2002 | Kitts | G06Q 30/0201 |
| | | | | 705/7.29 |
| 2014/0149513 | A1* | 5/2014 | Grennan | G06Q 30/0631 |
| | | | | 709/204 |
| 2014/0337513 | A1* | 11/2014 | Amalapurapu | G06Q 30/0269 |
| | | | | 709/224 |
| 2014/0363059 | A1* | 12/2014 | Hurewitz | G06Q 30/0201 |
| | | | | 382/118 |
| 2015/0161623 | A1* | 6/2015 | Rahman | G06Q 40/12 |
| | | | | 705/7.29 |
| 2018/0063146 | A1* | 3/2018 | Nakata | H04L 63/1441 |
| 2018/0144352 | A1* | 5/2018 | Ram | G06Q 20/10 |

(Continued)

OTHER PUBLICATIONS

Reilly, Michael. "Google Now Tracks Your Credit Card Purchases and Connects Them to Its Online Profile of You" (2017) MIT Technology Review (Year: 2017).*

(Continued)

*Primary Examiner* — Allison G Wood
*Assistant Examiner* — Katherine A Barlow

(57) ABSTRACT

Systems and methods for generating customer ID within an E-commerce platform are provided. Based on customer interactions with the e-commerce platform, evidence is collected, such as telephone numbers, names, addresses etc. The evidence is standardized to allow comparison/correlation. The evidence is then filtered to remove certain evidence determined to be unreliably associated with specific customers. For example, many customers may enter a fake phone number "0000000000". Then, correlation is performed based on the filtered evidence to identify links between the evidence and associate sets of linked evidence with unique customer IDs.

21 Claims, 14 Drawing Sheets

(56) References Cited

U.S. PATENT DOCUMENTS

2019/0124167 A1* 4/2019 Reshef ................... H04L 67/02

OTHER PUBLICATIONS

Schiff, Allison. "LiveRamp's On A Ques For The Unifed Cusomer ID—And It's Adding Probabilisic Data Matching As One Option To Get There" AdExchange.com (Year: 2015).*
Rutkin, Aviva. "Just four credit card clues can identify anyone" NewScientist.com (Year: 2015).*
Ratcliff, Christopher. "Guest checkout test: which of these 25 US retailers force users to register?" Econsultancy.com (Year: 2014).*
Freeman, Karen, et. al. "Three Myths about What Customers Want" Harvard Business Review. HBR.org (Year: 2012).*

* cited by examiner

FIG. 2

SYSTEM AND METHOD OF PROVIDING CUSTOMER ID SERVICE WITH DATA SKEW REMOVAL

FIELD

The present invention relates to a system and methods of tracking data within an e-commerce platform.

BACKGROUND

Some online stores employ a user ID and password authentication, which are entered by the customer when accessing an on-line store or platform. In such a store, all transactions by the same customer are easily grouped together by user ID. For example, when a user logs onto Amazon™, the customer enters a user ID and password and the system maintains a history of activity for the customer.

However, some online stores do not employ the concept of a user ID and password; instead, each transaction is a standalone event.

Alternatively, in an e-commerce platform that provides online stores for multiple merchants, while there may be respective user ID and password for one or more of the stores, there is nothing linking the user ID and password for one store to that of another store.

SUMMARY

The present invention relates to a system and method of analyzing data within a large data system such as an ecommerce platform in order to determine specific customers and provide the identified customers with a unique identifier (or "Customer ID"). The system and method may account for various factors that would slow down a data analysis system (such as non-standardized data formatting) or potentially lead to inaccurate data analytic conclusions (such as false information).

According to one aspect of the present invention, there is provided a computer implemented method of generating customer identifiers (IDs) method comprising: collecting evidence associated with a plurality of customer interactions with an e-commerce system; filtering the evidence to remove evidence to be excluded from data correlation, the filtering being configured to exclude evidence that is determined to be unreliable according to a filtering criteria or method; performing correlation on the evidence remaining after filtering, and associating each set of correlated evidence with respective unique customer ID; outputting each customer ID, and the correlated evidence associated with the customer ID.

In some embodiments, the method further comprises: performing evidence standardization before filtering the evidence.

In some embodiments, the method further comprises: receiving an input identifying specific evidence associated with the customers to be excluded; removing the customer ID(s) associated with the specific evidence.

In some embodiments, filtering the evidence comprises: for at least one type of evidence: counting instances of each specific value of the type of evidence; where a number of instances of a specific value of the type of evidence is greater than a threshold, removing that specific value such that it does not remain after filtering.

In some embodiments, the method further comprises: configuring a respective threshold for each of at least two types of evidence.

In some embodiments, filtering the evidence comprises performing a data centrality analysis.

In some embodiments, filtering the evidence comprises removing any evidence matching an entry on a blacklist and/or keeping any evidence matching an entry on a whitelist.

In some embodiments, the method further comprises: receiving an input configuring the filtering.

In some embodiments, the input configures the filtering to perform a selected one of: Threshold based evidence filtering; Centrality analysis based evidence filtering; Blacklist based evidence filtering; Whitelist based evidence filtering.

In some embodiments, collecting evidence comprises collecting evidence associated with transactions with a single merchant through one or multiple channels.

In some embodiments, collecting evidence comprises collecting evidence associated with transactions with any one of a plurality of merchants through one or multiple channels.

According to another aspect of the present invention, a customer identifier (ID) generator system comprising: a customer ID generator configured to generate customer IDs based on customers interactions with an e-commerce system, the customer ID generator configured to: collect evidence associated with a plurality of customer interactions with the e-commerce system; filter the evidence to remove evidence to be excluded from data correlation, the filtering being configured to exclude evidence that is determined to be unreliable according to a filtering criteria or method; perform correlation on the evidence remaining after filtering, and associating each set of correlated evidence with respective unique customer ID; output each customer ID, and the correlated evidence associated with the customer ID.

In some embodiments, the customer ID generator system is further configured to detect customer interactions with the e-commerce system.

In some embodiments, the customer ID generator is further configured to: perform evidence standardization before filtering the evidence.

In some embodiments, the customer ID generator is further configured to: receive an input identifying specific evidence associated with the customers to be excluded; remove the customer ID(s) associated with the specific evidence.

In some embodiments, the customer ID generator is further configured to filter the evidence by: for at least one type of evidence: counting instances of each specific value of the type of evidence; where a number of instances of a specific value of the type of evidence is greater than a threshold, removing that specific value such that it does not remain after filtering.

In some embodiments, a respective threshold is configured for each of at least two types of evidence.

In some embodiments, the customer ID generator is further configured to filter the evidence by performing a data centrality analysis.

In some embodiments, the customer ID generator is further configured to filter the evidence by removing any evidence matching an entry on a blacklist and/or keeping any evidence matching an entry on a whitelist.

In some embodiments, the customer ID generator is further configured to receive an input configuring the filtering.

In some embodiments, the input configures the filtering to perform a selected one of: Threshold based evidence filtering; Centrality analysis based evidence filtering; Blacklist based evidence filtering; Whitelist based evidence filtering.

In some embodiments, the system is configured to collect evidence associated with transactions with a single merchant through one or multiple channels.

In some embodiments, the system is configured to collect evidence associated with transactions with any one of a plurality of merchants through one or multiple channels.

BRIEF DESCRIPTION OF THE DRAWINGS

Embodiments of the disclosure will now be described with reference to the attached drawings in which:

FIG. 2 is a wireframe diagram showing an example of a home page of an administrator in an e-commerce platform;

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

An e-commerce platform, through all user interactions, is able to collect a large amount of data on visitors. This data may be analyzed and leveraged in order to create useful services and metrics for business optimization. For example, this data may be studied to learn what options make certain visitors find the products they want and what makes a user come back to different stores. This can be leveraged to ensure an ecommerce platform presents a user with the preferences most likely to result in completing a purchase each time the user accesses an online store. However, a user may visit an online store on multiple electronic devices, such as a computer and also on their phone, or at multiple times.

Data for transactions can be analyzed in an attempt to correlate transaction data, and conclude a set of transactions involve the same customer. However, current ecommerce platforms that do not employ user ID and password at all, or that employ unrelated user ID and password for different stores, do not have an accurate way of analyzing available data in order to accurately determine when a set of visit instances is from the same person or household (i.e. a single customer). A reason for this is in large ecommerce platform ecosystems, there are significant instances of visit data that may appear to be related to the same customer, that in reality are unrelated. For example, a user may be reluctant to enter, or too lazy to enter, certain fields, such as telephone number, and instead enter a fake phone number as the all 0's phone number 0000000000. Grouping transactions by phone number in this case would yield inaccurate results, because multiple different customers would enter this same phone number. In addition, customers may be asked by a shipping or withholding company to put the shipping company phone number for delivery, so again, grouping transactions by that number will be inaccurate. Current data analytic techniques do not have any accurate way of ensuring that the system is not analyzing an inappropriate subset of data from a given ecommerce ecosystem.

In addition, a database with a large amount of inappropriate data (i.e. fake numbers) can severely downgrade performance of queries, especially those tables made of combined data. Combined data between tables that include a large amount of information may require shuffling data and the skew can lead to an extreme imbalance of work in the cluster.

Figure 1:
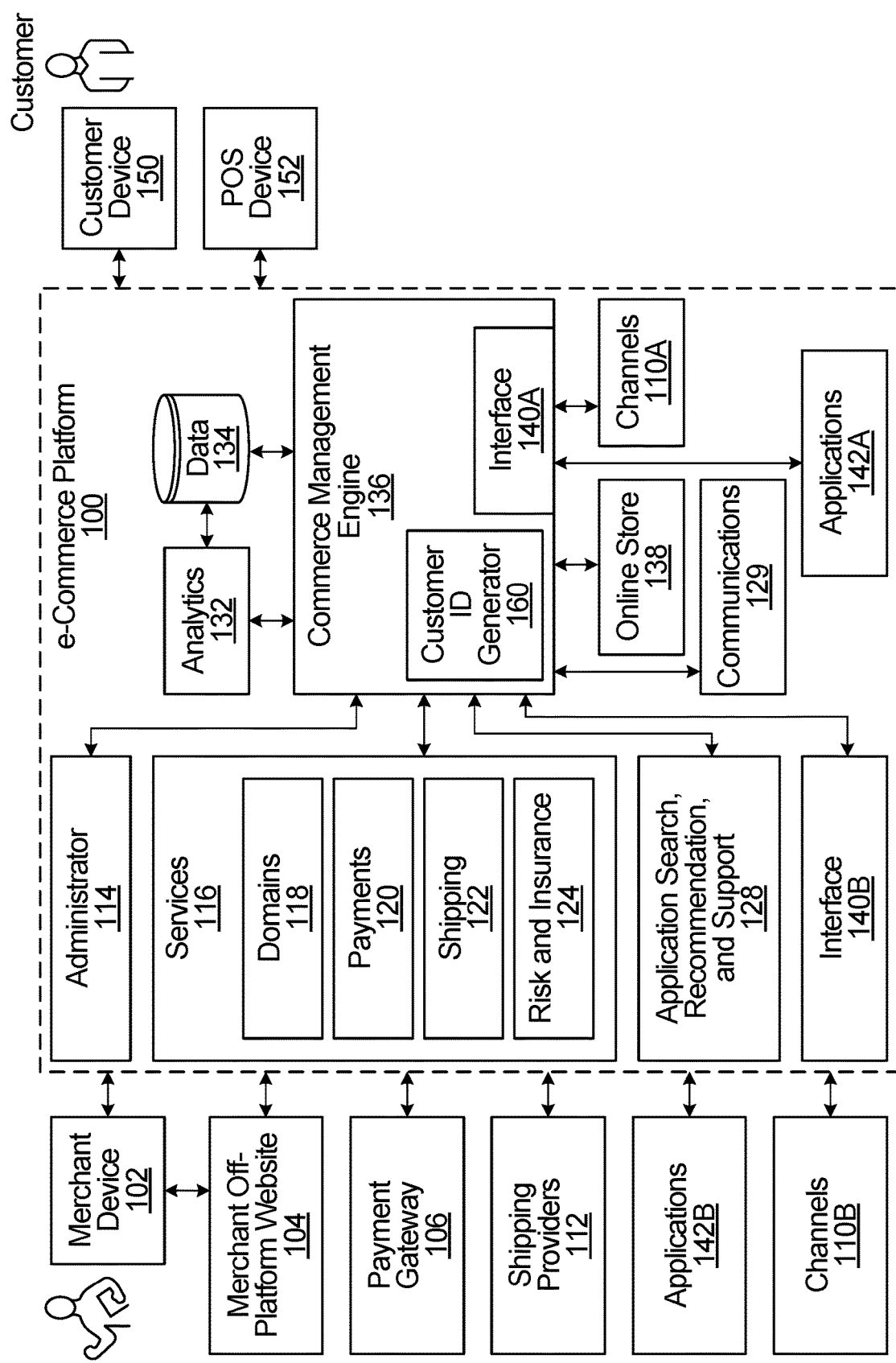
FIG. 1 is a system diagram showing an e-commerce platform for providing merchant products and services to customers.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
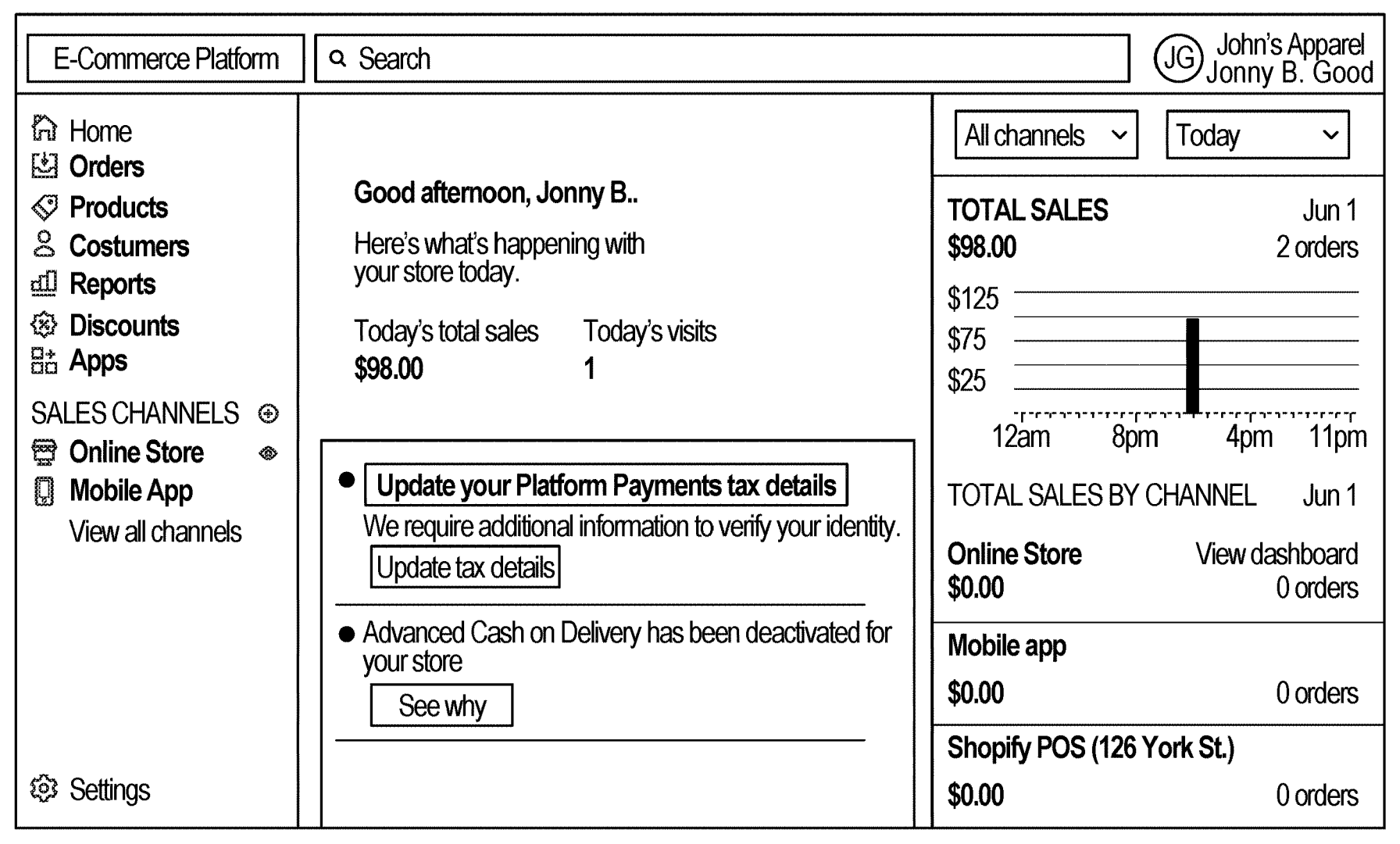

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

The commerce management engine 136 includes a customer ID generator 160 configured to generate customer IDs using one or a combination of the methods described below. While the customer ID generator 160 is shown as part of a specific e-commerce platform, more generally, it can be implemented within e-commerce platforms generally. The customer ID generator 160 may be implemented in hardware, or a combination of hardware and software, and is equipped with the ability to interface with other sources of data in the system, and to store an output in memory, or to produce an output on a physical display.

The above described embodiment provides an E-commerce system that is equipped with a customer ID generator. Another embodiment provides a customer ID generator system per se that includes a customer ID generator. Such a system may be configured to interact with an E-commerce platform or other some other system, channel or combination of systems and/or channels, for example to detect or receive information concerning customer interactions upon which to base the customer ID generation. Such a system will typically include at least one processor that is configured to perform the customer ID generation, for example through the use of computer executable code stored in a memory, or through a direct implementation in hardware of the customer ID generation functionality. The system may also have its own storage to maintain the information concerning the detected interactions, and also to maintain the generated customer IDs. In addition, the system may have an API or other interface for other applications to query the customer ID generator system for a previously determined customer, based on one or more pieces of information for a current transaction. The customer ID generator system may also have the capability of generating reports of all transactions involving a specific customer ID; in some embodiments, where this report is to be made available to a merchant, the report would be limited to transactions with that specific merchant. In other embodiments, transaction history is provided in a manner that abstracts out the actual customer ID, but in a manner that may still be useful in that it shows a cross-merchant pattern of behaviour.

Customer Interactions

Figure 3:
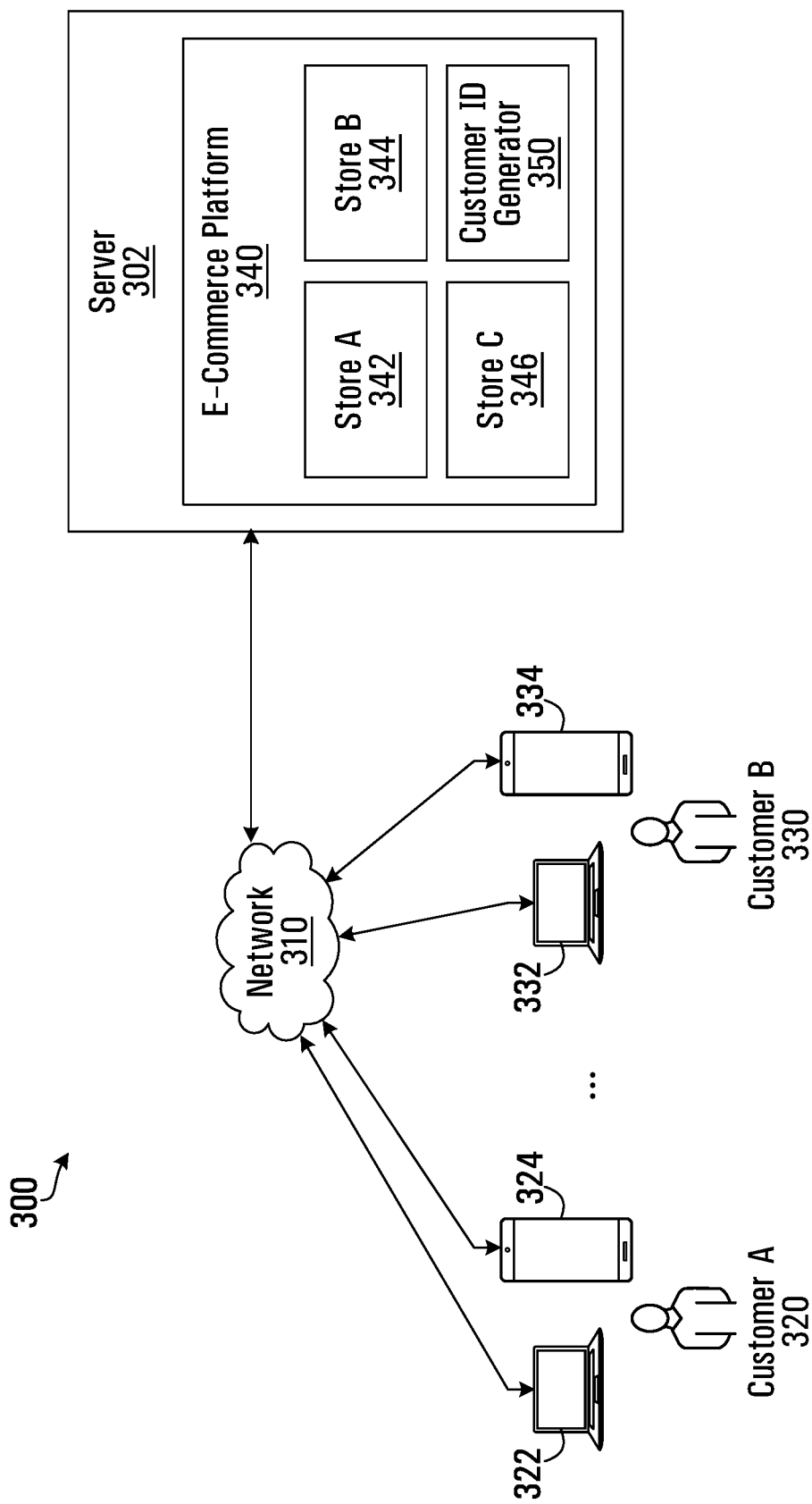
FIG. 3 is a system diagram showing the use of an e-commerce platform.

FIG. 3 is a diagram of an example of the use of a system 300, according to one embodiment. The system 300 includes a plurality of electronic devices 322, 324 belonging to/associated with a first customer A 320, and 332, 334 belonging to/associated with a customer B 330 While this figure only illustrates two customers within the system 300, any plurality of customers and electronic devices would be able to access the system 300. The system 300 further includes a network 310, and an ecommerce platform 340 that can be hosted on a server 302. The plurality of electronic devices 322, 324, 332, 334, network 310, and server 302 may include a network interface, processor, and a memory. The server 302 may be able to access other memories stored on other network connected devices via the network 310.

Electronic devices do not necessarily have to be the same type of device. For example, as shown in FIG. 3, devices 322 and 332 may be personal computers such as laptops, while devices 324 and 334 may be smartphones.

The E-commerce platform 340 allows multiple online stores, hereinafter simply stores, to be implemented for one or multiple merchants. In the illustrated example, the E-commerce platform 340 is configured to implement three stores, referred to as Store A 342, Store B 344 and Store C 346. For the purpose of this example, it is assumed these stores are associated with different merchants, and that therefore, a merchant selling merchandize through store A will be unaware of the activity in stores B and C.

Also shown is a customer ID generator 350 configured to process transaction data from one or multiple online stores, such as stores 342, 344, 346, in order to associate data of transactions performed by the same customer with a unique customer ID. Operation of the customer ID generator 350 will be described in detail below. In operation, the customers 320 and 330 can use electronic devices 322, 324, 332, and 334 to access the ecommerce platform 340. The users may access through the ecommerce platform 340 any number of stores, such as store A 342, store B 344, and store C 346. The users may browse stores, look at products and complete purchases as previously described.

The server 302 may include a processor and memory. The processor may be implemented by one or more processors that execute instructions stored in memory. The instructions, when executed, cause the processor to perform the operations described herein. Alternatively, some or all of the processor may be implemented using dedicated circuitry, such as an ASIC, a GPU, or a programmed FPGA for performing the operations of the processor. The server may store executable software for utilization of a feedback algorithm for generating product recommendations.

Method Overview

Figure 4:
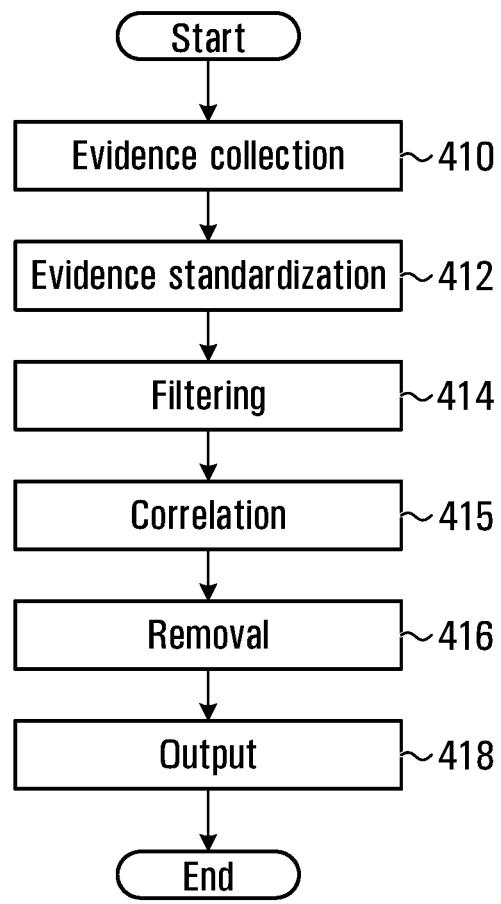
FIG. 4 is a high-level overview showing a method of creating a unique identifier for a specific customer over multiple customer interactions in an e-commerce system.

FIG. 4 is a high-level overview of a method 400 of creating a unique identifier for a specific customer over multiple customer interactions in an e-commerce system (or 'Customer ID') with the ability to remove factors that may obfuscate any data analysis, according to one embodiment, and in particular avoid associating transactions and data with the same customer ID that in fact did not involve the same customer. The method includes the steps of evidence collection 410, evidence standardization 412, filtering 414, data correlation 415, data removal 416, and data output 418. The method may be run by the customer ID generator 350 of FIG. 3, but more generally may be run within a system on a server connected to a network.

Figure 5:
FIG. 5 is a systematic state diagram of a customer's interaction with an ecommerce platform.

The evidence collection step involves receiving/inputting data from an ecommerce platform (such as data units 520A-520N in FIG. 5.) In general, each data unit is a set of data associated with a single customer interaction. The standardizing step involves standardizing the data, or more generally at least one field within the data, into a single or common format. Standardized data will then be filtered at step 414 to identify specific outlier data that may be identified as being fraudulent, fake, or not indicative of being common to a single customer. At step 415, the system will analyse data remaining after the filtering step and determine which sets of transactions/data units that should be associated with a respective common customer ID and store this, for example in a customer ID table. At step 416, the system may optionally identify if any customers may have identified themselves as requesting to not be included in any commercial analysis, and remove these potentially identified customers from any customer ID table. Finally, at step 418, the system generates an output containing what remains in the customer ID table.

According to some embodiments, the process can detect the arrival of new pieces of evidence and analyze only new data for a specific customer ID to be added to the output table of step 418. According to other embodiments, the process rebuilds the complete history of information each time the process is run.

Categorizing Interactions

FIG. 5 represents a systematic state diagram of a customer's interaction with an ecommerce platform (such as via customer device 150 on ecommerce platform 100), according to some embodiments. The states includes three states, specifically, a visit state, hereinafter simply visit 510, an intent state, hereinafter intent 520, and a purchase state, hereinafter purchase 530.

In operation, the state of a customer interaction can be categorized in visit 510 when they first access an online store. The state of the customer interaction will be re-categorized from visit 510 to intent 520 once they have viewed an item. The state of the customer interaction will be re-categorized from intent 520 to purchase 530 once the customer has completed a transaction.

Figure 6:
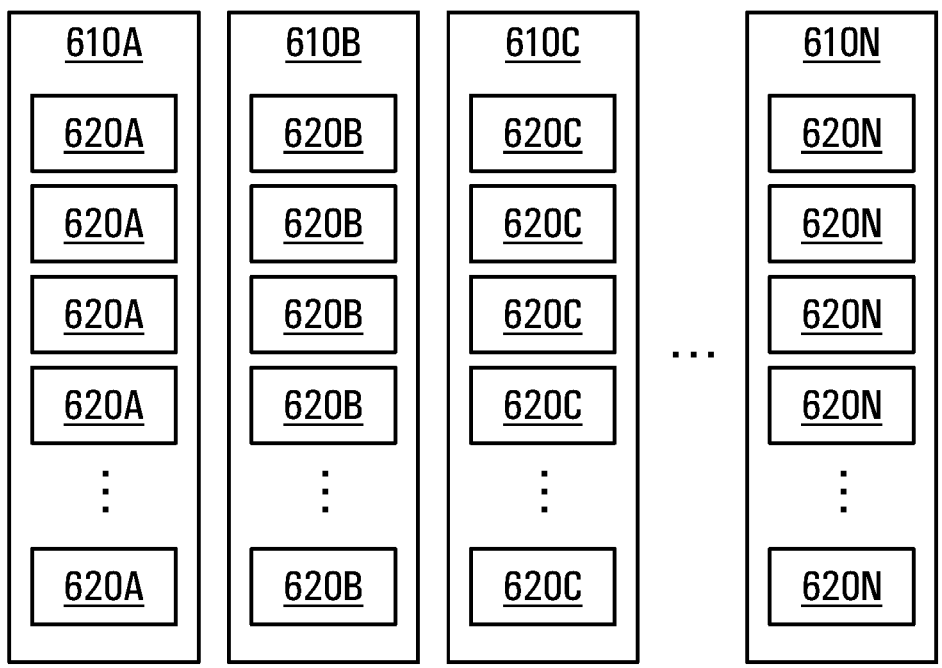
FIG. 6 is a visual representation of all data stored in an e-commerce platform.

As a customer interaction progresses through these states, the customer will have given the platform 100 increasing amounts of data. The data available to the platform 100 for a customer interaction classified as visit 510 may be
  IP Address
  Browser Data
  Device Data
  Location Data
  Time on site The data available to the platform 100 for a customer interaction classified as intent 520 may be:
  IP Address
  Browser Data
  Device Data
  Location Data
  Time on site
  Products Visited If a customer interaction classified as intent 520 has added a product to their cart, the identities of the product will also be available. If the customer has begun a checkout process, the system may have other information such as the customer's name, email address, and phone number. The data available to the platform for a customer interaction classified as purchase 530 may be:
  IP Address
  Browser Data
  Device Data
  Location Data
  Time on site
  Products Visited
  Cart Items
  Email Address
  Shipping Info
  Payment Info
  Order details FIG. 6 shows a visual representation of all data stored in an ecommerce platform about customers, according to one embodiment. The data is organized by each individual merchant. Shown is a dataset 610A for a first merchant, a second dataset 610B for a second merchant, a third dataset 510C for a third merchant, and so on, to an Nth dataset 610N for an Nth merchant. Each merchant dataset 610A-610N contain respective data units 620A-620N representing information collected through customer interactions, through the associated store(s) of the merchant, with customers. Each unique data unit 620A-620N may be related to a specific visit 510, intent 520, and purchase 530.

A customer interaction that begins as a visit 510 may concern a customer in an online store using an electronic device such as a laptop. The same customer may be involved in a further customer interaction in the visit 510 the same online store on their mobile phone.

Each data unit 620A-620N contains information collected during the customer interaction. Each data unit may include information such as:
  IP Address
  Browser Data
  Device Data
  Location Data
  Time on site
  Products Visited
  Cart Items
  Email Address
  Shipping Info
  Payment Info
  Order details The amount of information collected, and stored in a data unit, for a customer interaction will increase, as the interaction progresses from the visit state to the intent state to the purchase state.

In some embodiments, each customer interaction is uniquely identified within the system.

Based on the information stored for customer interactions, as depicted in FIG. 6 by way of example, the system attempts to identify sets of customer interactions that are associated with the same customer, and labels each such customer with a respective unique identification code referred to herein as a customer ID, and associates some or all of the information in the associated data units with the customer ID. According to one implementation, data may be accrued from many transactions and many merchants to identify customer interactions.

Evidence Collection

Figure 7:
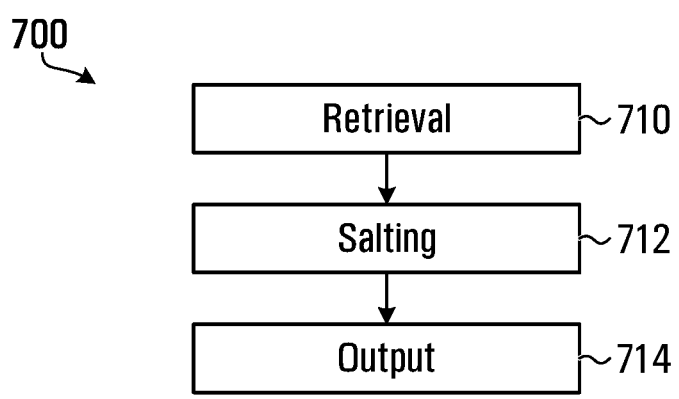
FIG. 7 is a system flow diagram of an example implementation of a data collection step in a method for generating customer identification.

FIG. 7 is a system flow diagram of an example implementation of the data collection step, according to one embodiment. According to this embodiment, data collection includes the steps of retrieval 710, salting 712, and output 714.

In the retrieval step 710, a server makes a network request to access information, in the form of data units, stored in an ecommerce platform. This information may be stored in multiple locations. This may include multiple physical servers, or may be different sublocations or subfolders within a specific memory. Alternately, the data units may be stored in different sublocations or subfolders within a central database on the e-commerce platform 100.

In the salting step 712, a customer ID for each data unit is affixed with an identifier indicative of its source location from retrieval step 710. For example, a customer ID of value "1001" may be modified to be a value "8501001" to indicate that the value 1001 came from a sub-location identifiable by number "850". In an alternate implementation, each data unit is retrieved from a database (e.g. order_ids, check-out_ids) and is salted with an identifier indicative of its source type; a customer ID may be extracted from the different primary sources.

Finally, in the output step 814 data may be stored in an output table to be standardized in step 612.*aa*

Figure 8:
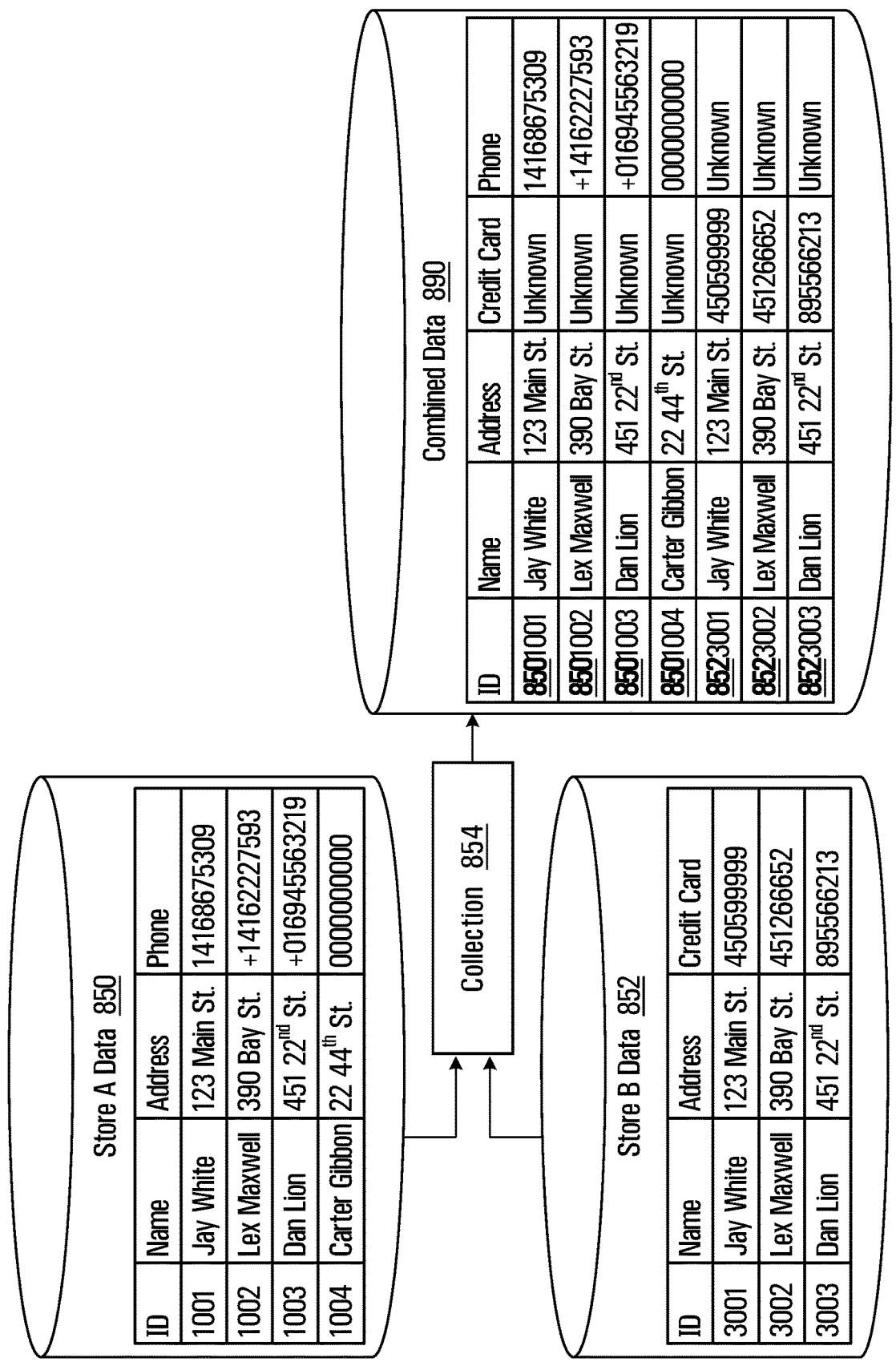
FIG. 8 is a visual representation of data collection in a method for generating customer identification in an ecommerce platform.

By way of example, FIG. 8 is a system diagram of the collection step 854 in a method for generating customer identification in an ecommerce platform, according to one embodiment. The system includes a first database 850 or memory containing data for a first online store A, referred to as Store A Data, and a second database 852 containing data for a second online store B, referred to as Store B Data. Also shown is a collection algorithm 854, and output server 890. The Store A data and Store B Data include data tables which have been populated with example data purely for illustrative purposes. While the present embodiment only has two input tables, it would be obvious to a person skilled that any number of inputs may all exist on any number of servers. In some embodiments there is one input table per online store. In some embodiments, there is one input table per merchant, where a merchant has multiple online stores.

In an alternate implementation, the individual databases may refer to different types of information that are aggregated from many merchants. For example, the database 850 may store all order information for all merchants, and the database 852 may store all checkout information for all merchants. In either implementation the data is collected into the output server 890 in the same manner.

The tables stored in databases 850, 852 contains information related to customer and potential customer interactions such as email addresses, phone numbers, and credit card numbers. Evidence can be collected from multiple locations that may not necessarily be in the same database. The data content may be different from on input to another. For example, the data unit for each customer action stored on database 850's data table includes a unique identifier, name, address, and phone number and the data unit for each customer interaction stored on database 852 includes credit card but does not include phone numbers. Data is retrieved from the databases 850, 852, processed, and outputted to output server 890 containing a combined data table. This combine data table includes all data available about data units for customer interactions that are stored in servers 850, 852. Each data unit in table 890 includes the unique identifier from the originating table, salted to include information about its source location, This is the full dataset available to be analyzed for determination of a customer ID.

Evidence Standardization

Figure 9:
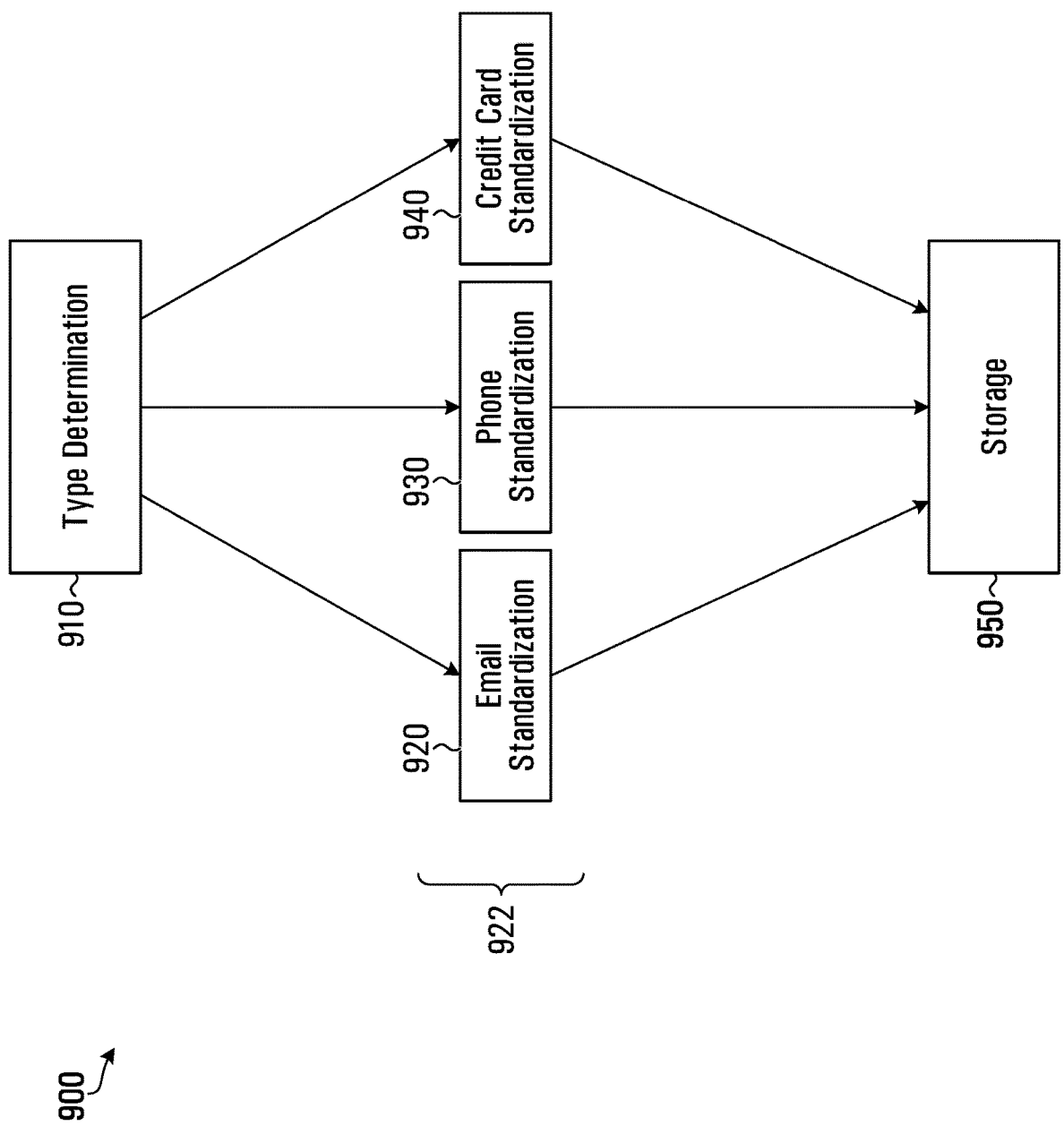
FIG. 9 is a system flow diagram of an example implementation of an evidence standardization step in a method for generating customer identification.

FIG. 9 is a system flow diagram of a method of evidence standardization 900, according to one embodiment. Evidence may exist in different formats within a single source or across multiple sources. In order to make the collected evidence meaningful and comparable it is necessary to apply standardization to the evidence collected. Standardization may be applied to one or more fields, such as for example email address, phone number, credit card information, shipping address.

This method includes a data type determination step 910. Once data type has been determined, the method will begin data subtype standardization steps 922, which may be email standardization 920, phone standardization 930, and credit card standardization 940. More generally, any data type may be standardized according to a pre-defined protocol. Once the data subtype standardization has taken place, data may then be stored in an output at step 950.

Data type determination step 910 analyzes an input data and determines what data subtype standardization step is to be performed to standardize the selected type of data. For example, if the system has been inputted a phone number field, the data type determination step 910 would direct the processor to standardize the data field according to phone standardization process 930.

Email providers may have different handling of the email addresses they provide. For some providers, any periods within an email address are treated are ignored. For example, an email sent to "e.x.a.m.p.l.e@test.com" and "example@test.com" would be delivered to the same inbox. Other email providers would deliver these emails to separate inboxes. Similarly, some email providers allow for the use of special characters within an email address. Some providers may ignore a specific character in email addresses and anything that follows it. For example, an email set to email address "example+extra@test.com" and "example@test.com" would be delivered to the same inbox.

Email standardization 920 may include ensuring the data is case insensitive by turning all letters to lowercase. Other methods of email standardization may account for specific provider operational settings in treatment of special characters.

Telephone numbers may also come in different formats. This may be the result of user entry or international formatting. A north American number of the form (XXX) XXX-XXXX is different than a European number of the form +1 YYY YYY-YYYY. International area codes further complicate the problem. International and country based rules apply as to which part is essential or optional. Some phone number fields at in some ecommerce platforms may be "free text" fields (allowing data entries of any form).

One example of phone number standardization 930 may be implemented using regular expressions (RegEx). For example, the regex string

'^[\+]?0+1?|^[\+]?1|[^0-9]' will keep only numeric characters, discarding anything else than '0-9'. In addition, if the phone starts with '+1', it will discard it. This would also apply if a phone number starts with any number of '0's followed by a '1'. This expression would discard the '0's and the '1'. Finally if a phone number starts with any number any number of '0', it will discard all leading zeroes.

Credit card standardization 940 is only able to operate using the information available about a credit card to the system. As this is financial and sensitive information, often a bank or credit card issuer will place restrictions on the amount of information which may be stored by a company. According to one embodiment, the system may have access to the following credit card information:

Credit Card First Name
Credit Card Last Name
Credit Card First Five Digits
Credit Card Last Four Digits
Expiry Month
Expiry Year In storage step 950, the algorithm will take the standardized data subtype and store the standardized value in an output data table. Thereby, the complete output of data standardization will include all data forms within a pre-defined format.

Figure 10:
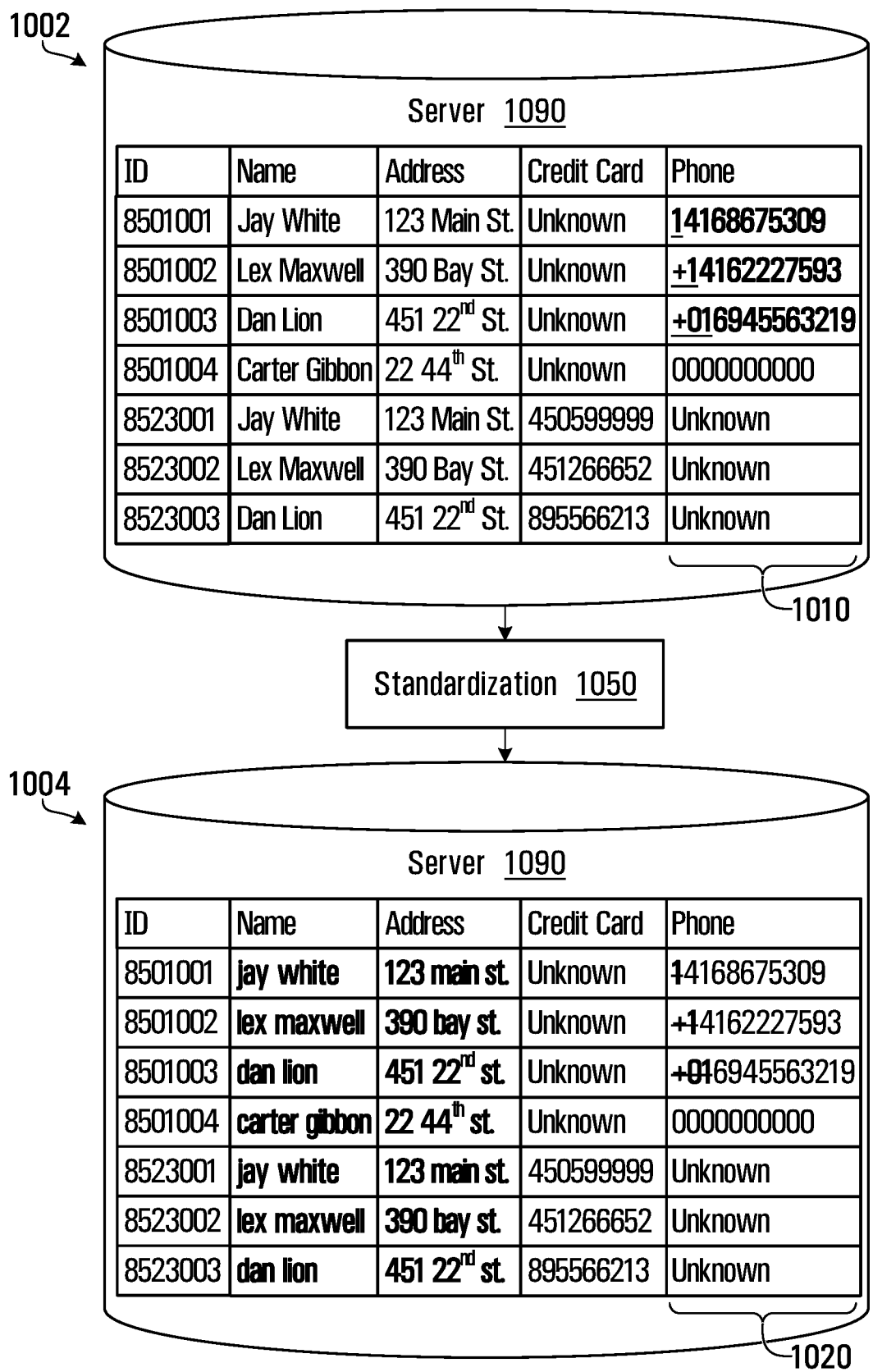
FIG. 10 is a visual representation of evidence standardization in a method for generating customer identification in an ecommerce platform.

An example of standardization 1050 is shown in FIG. 10, where an input data table 1002 and an output data table 1004 have been populated with example data for illustrated purposes. Input data table 1002 is stored on server 1090 and contains multiple phone number formats 1010. The input and output data servers include data tables which have been populated with example data purely for illustrative purposes. After standardization 1050, the output data table 1004 stored on server 1090 contains a standardized format. In this case, the formatting has removed all instances of "1, +1, and +01" in order to leave a ten digit number for data processing, and name and address data has been standardized to only include lowercase characters. For illustrative purposes, deleted data has been represented by a strikethrough. After standardization, there is a table containing one data unit per customer interaction, with standardized fields that can be compared to each other as between multiple data units.

Evidence Filtering

Figure 11:
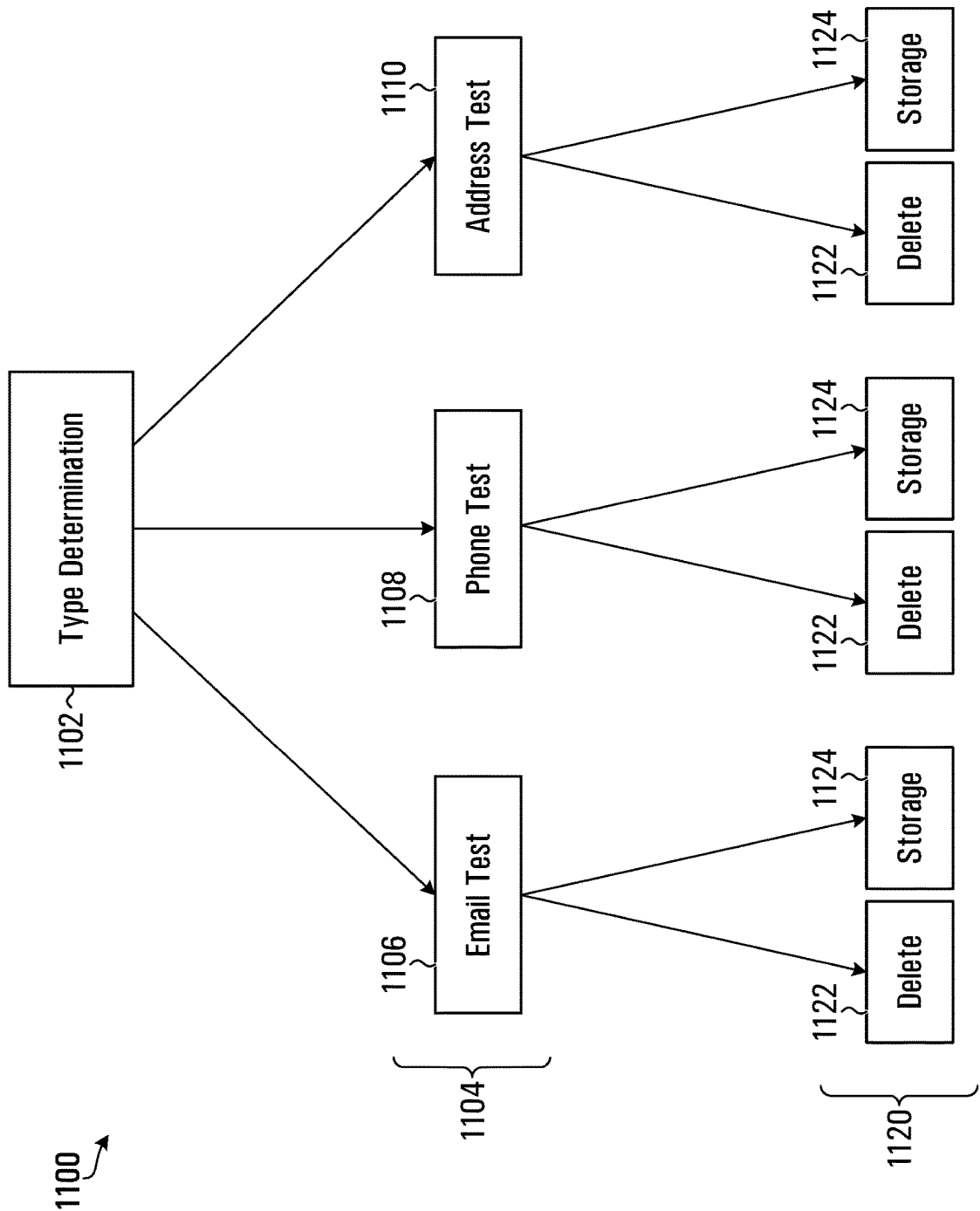
FIG. 11 is a system flow diagram of an example implementation of an evidence filtering step in a method for generating customer identification.

FIG. 11 is a system flow diagram of a method of evidence filtering 1100, according to one embodiment. This method includes a type determination step 1102, data subtype tests 1104, which may include an email test 1106, phone test 1108, and address test 1110, and decision action step 1120, which may include a delete function 1122 and storage function 1124. A person skilled would know that data subtype tests 1104 are not limited to those described in this example, and may include any form of data type stored within the system. The evidence filtering operation operates on selected data fields within the data units of the standardized table. For example, filtering may be configured for email address, phone number and address. However, the fields that are filtered may differ. The objective of the filtering step is to remove data that is questionable as to its relationship to a specific customer. For example, this can involve removing a questionable phone number from one or multiple data units of the standardized data set. The data unit remains in the standardized data set, but the phone number field is empty, or contains an invalid flag or other indication not to consider the field for correlation purposes.

Data type determination step 1102 is similar to that of data type determination step 910. The processor analyzes an input data and determines what data subtype test step 1104 must be required to test the data. For example, if the system has been inputted a phone number field, the data type determination step 1102 would direct the processor to test the data field according to phone test 1108.

Data subtype tests 1104 may be tailored to the specific data subtype. Each data subtype test 1104 will direct the processor to either keep the data, storing store data point 1124, or to delete the data entry 1122 from the system. For example, phone tests 1108 may test for test or fake phone numbers: e.g. 0000000000, 9999999999, 5555555555, 234567890, etc. Similarly email test 1106 may test for whether or not an email address has been registered to a fake account or on a domain known for fake accounts. Address test 1110 may cross-reference the input address with postal data to ensure accuracy.

According to some embodiments of the present invention, data subtype tests for one or more data subtypes includes coarse filtering of skewed data. In a specific example, this is done by a counting the number of occurrences of a specific piece of evidence (ex. Phone number or address) that exist within the standardized data set. If the count of the number of instances surpasses a fixed limit defined, the processor will instruct the system to delete the evidence 1122. The processor may also log offending evidence for further analysis. The fixed limit may be the same or different for different data subtypes.

According to some embodiments, data filtering may use a blacklist and whitelist. This may require the use of a stored list on a server that includes data identified to be data that should not to be included (i.e. blacklist data). For example, a blacklist could include a list of all non-deliverable zipcodes or credit card numbers that are not compliant with a certain numerical pattern. Similarly, a whitelist may require the use of a stored list on a server that includes data identified to be data that should be included despite appearing frequently enough to be otherwise filtered out, for example based on a course filtering step. One example of this would be any customer who enters in as an address the address of a shipping facilitation company. While the address may not be unique to the customer, the address may still assist the system in determining a unique customer identifier for the purchasing customer.

According to some embodiments, data filtering may use methods of data centrality analysis. Data centrality analysis may include mapping information (such as specific customer interaction data) as nodes, and generating links to represent the relationship between multiple nodes (i.e. shared or similar information stored about the specific customer interaction data). Data centrality employs methods to identify the most important links and nodes in a given set of information. There are different types of centrality analysis techniques that can be used for data filtering, such as degree similarity, closeness centrality, betweeness centrality, eigenvector centrality and Katz centrality. Other types of centrality suitable for such an application would be known to a person skilled in the art.

For example, degree similarly may be employed to determine the number of connections a particular node has in the network. A connection may represent the elements in common a specific node has with all other nodes already existing within a data network. The more connections the specific node has (i.e. the more elements of information in common data stored about a specific customer interaction has with other data stored about customer interactions in the network), the less likely it is that the specific unit of data represents a unique customer interaction. As such, the system may determine a degree similarity threshold, wherein if a unit of data exceeds the threshold, the data unit would be removed from further analysis.

Data centrality may also be used to automate or semi-automate the process of discovering which nodes are most influential in causing many unrelated users to be lumped in the same entity. This information can be used to generate blacklist data as previously described.

Figure 12:
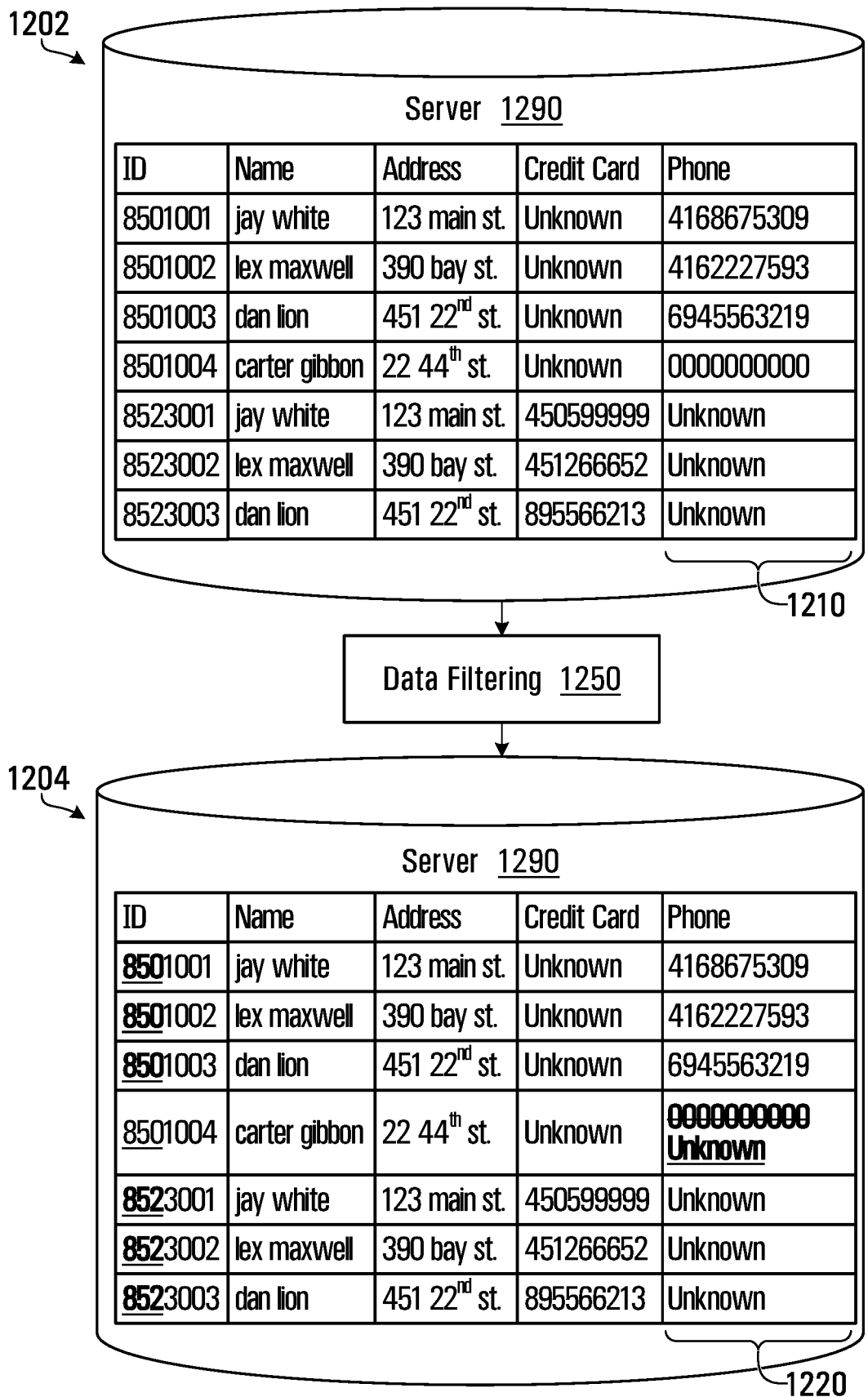
FIG. 12 is a visual representation of evidence filtering in a method for generating customer identification in an ecommerce platform.

FIG. 12 shows an example of data filtering 1250. The input and output servers include data tables which have been populated with example data purely for illustrative purposes. Input data 1202 is stored on server 1290, having phone numbers 1210. Output data 1204 may also be stored on the same server 1290. However, the data has been analyzed for removal. The system had determined that the entry in input data 1202 for ID 8501004 contained the fake phone number "0000000000" Therefore, the system replaced the entry 1220 in output data with an indicator that the data for this user ID's phone number is unknown. For illustrative purposes, deleted data has been represented by a strikethrough.

Evidence Correlation

Figure 13:
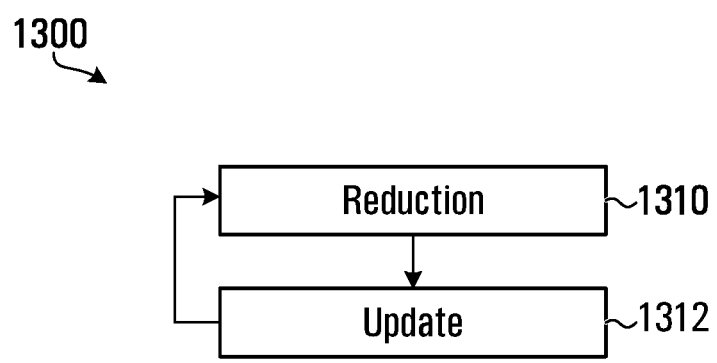
FIG. 13 is a system flow diagram of an example implementation of an evidence correlation step in a method for generating customer identification.

FIG. 13 is a system flow diagram of a method of evidence correlation 1300, according to one embodiment. According to this embodiment, the evidence correlation 1300 includes two steps to be performed one after the other until the number of unique customer identifiers generated no longer decreases. Evidence that occurs in a single data unit is linked, and assumed to be associated with a single customer. In an alternate implementation discussed later, the repetition of the two steps is eliminated in exchange for a more robust reduction step 1310.

In the reduction step 1310, the system will link together all evidence which has been determined by a processor to be linked together according to an evidence criteria or threshold. For example, the system can determine that email_a is linked to phone_1 based on a first data unit and email_b is linked to phone_1 based on a second data unit. Since email_a and phone_1 are associated with a customer, and email_b and phone_1 are associated with a customer, it can be concluded the data of the first and second data units is associated with the same customer. For this example, at least email_a, email_b and phone_1 are associated with the same customer. The system links these together under the same customer_ID. In some embodiments, customer_ID is initially set systematically according to the lowest customer ID of multiple data units that are being linked. The output of this first step is a mapping table between each data unit and a customer ID in the form of the selected customer ID which will be used for the next step. In the alternate implementation, the evidence is all gathered at once and the type of evidence and the evidence itself is concatenated into a single value. All evidence sharing associated information is assembled in a connected graph with a source node. In some embodiments, the source node is initially set systematically according to the lowest evidence of multiple data units that are being linked. The source node is linked to all other evidence (i.e. "destination nodes"). The data is then processed to create a fully connected graph of nodes that share associated evidence.

In the update step 1312, the system assigns a unique customer identification code to each element of data. If this update step is taking place on the second or greater iteration of evidence correlation 1300, the update step 1312 will replace in memory the unique customer identification code that had been previously assigned to the evidence in any previous iteration. In the alternate implementation, the system assigns a unique customer identification code to each fully connected graph. The destination nodes are joined to the new customer ID. Subsequently, the destination nodes, now associated with the new customer ID, are split back into the evidence and evidence type components. The full correlation of the customer information will be included in an output table.

Figure 14:
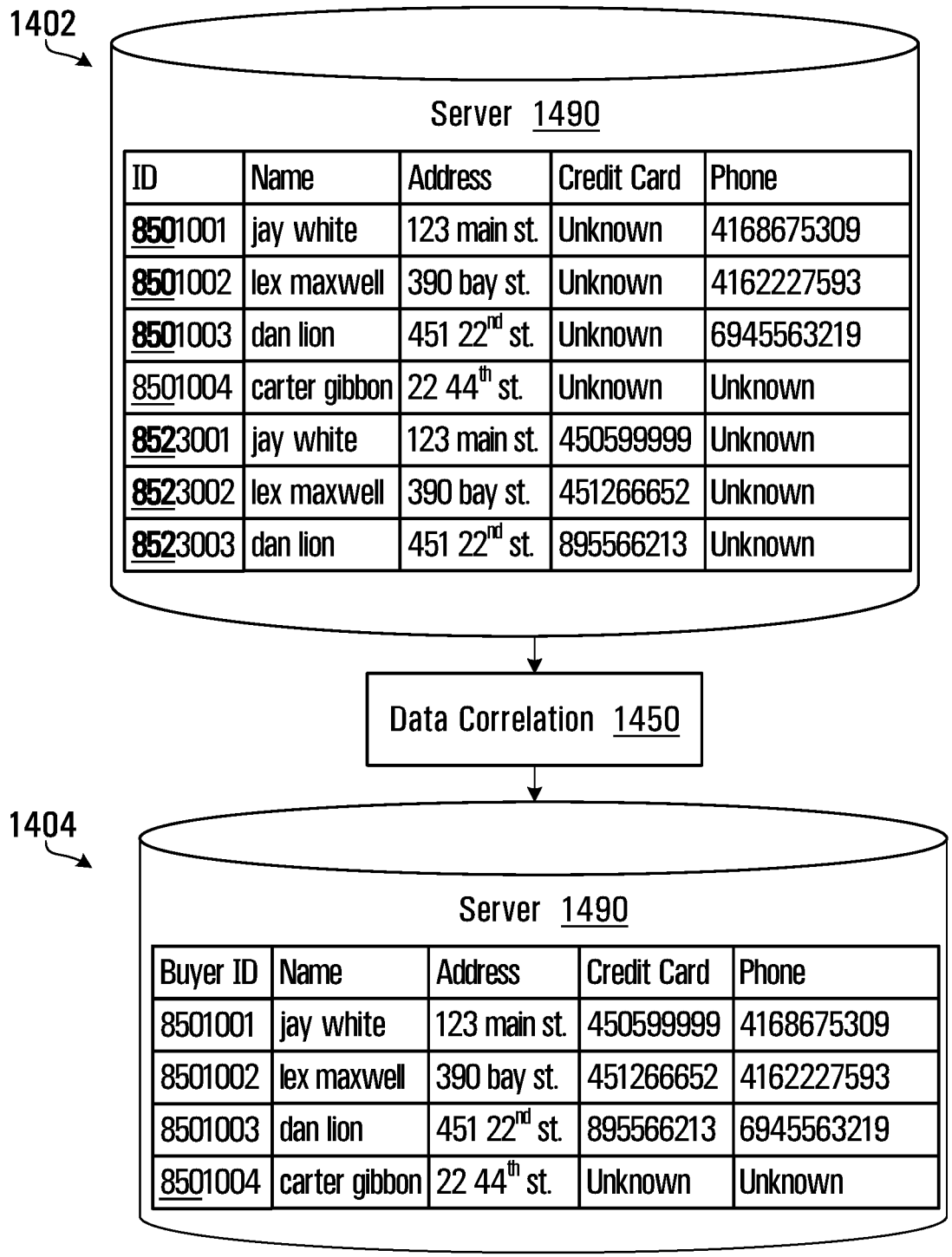
FIG. 14 is a visual representation of data correlation in a method for generating customer identification in an ecommerce platform.

FIG. 14 shows an example of data correlation 1450. The input and output servers include data tables which have been populated with example data purely for illustrative purposes. Input data in the form of a standardized data set subsequent to filtering 1402 is stored on server 1490. Output data 1404 may also be stored on the same server 1490. After the data correlation process, it can be seen that the method has reduced the data in half, having determined that there were multiple entries for the three names, each name relating to a single customer identified. Each unit of customer information has been merged and assigned the lowest customer ID. While the present example only includes an identifier, name, address, credit card, and phone, a person skilled would know that any data may also be stored in an input or output table, such as historical data like the former data identifier.

Evidence Removal

Figure 15:
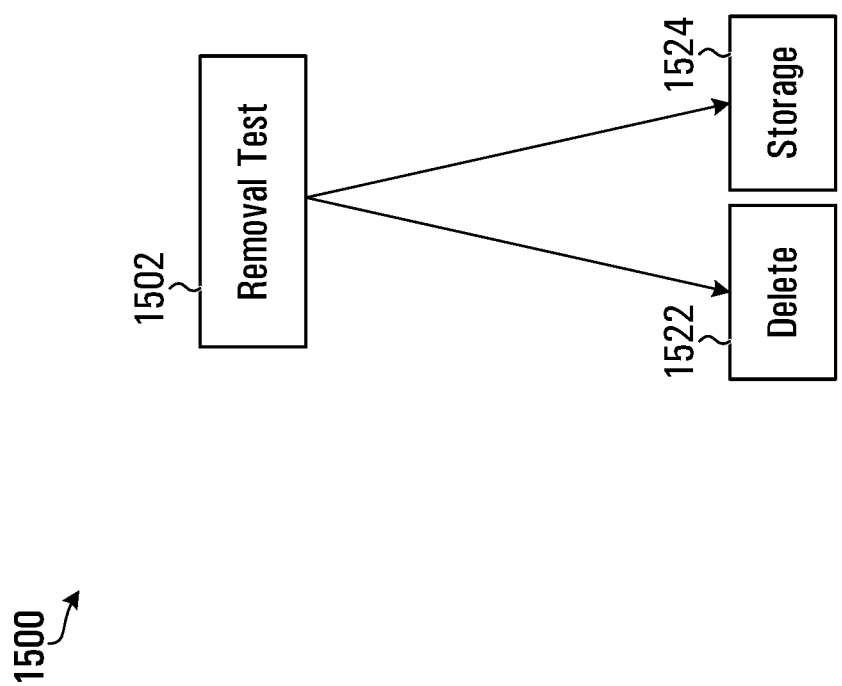
FIG. 15 is a system flow diagram of an example implementation of an evidence removal step in a method for generating customer identification.

FIG. 15 is a system flow diagram of a method of evidence removal 1500, according to one embodiment. According to this embodiment, the evidence removal 1500 includes a removal test step 1502 that may direct a processor to either a delete data step 1522 or store data step 1524.

In operation, at removal test 1502, the system will analyze each unique customer ID and determine if the user has requested removal from the system for the purposes of data analysis. This may include a processor comparing the customer's information in the input table with another data table that includes all users who have opted out of data analysis. If the user has requested to be removed from data analysis, the processor will be directed to delete step 1522, and the customer ID and all associated data will be removed from the output table. If the user does not exist in a table of users who have opted out of data analysis, processor will be directed to storage step 1524 and the customer information will be included in an output table.

Figure 16:
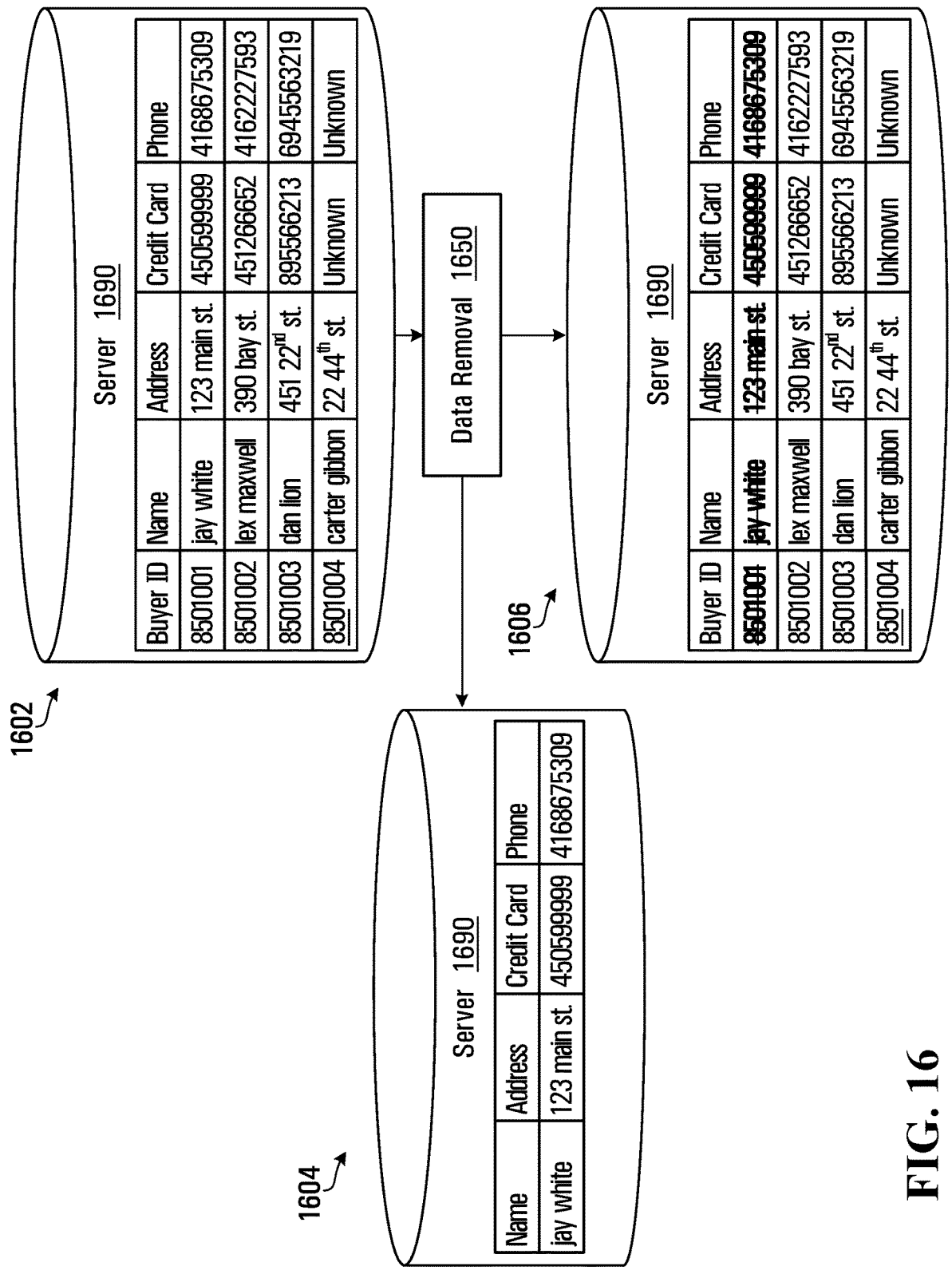
FIG. 16 is a visual representation of data removal in a method for generating customer identification in an ecommerce platform.

FIG. 16 shows an example of data removal 1650. The input and output servers include data tables which have been populated with example data purely for illustrative purposes. Input data 1402, opt-out data 1604, and output data can all be stored on server 1690. According to the present embodiment, the system may compare the evidence within input table 1602 with information in opt-out data 1604, in order to determine which users should be removed from input data 1602 in producing the output data 1606. For illustrative purposes, deleted data has been represented by a strikethrough.

More generally, for the purpose of excluding certain customers from the output, an input can be received identifying specific evidence associated with the customers to be excluded. This could be the name of a specific user for example. Based on the name (or other evidence), the system identifies the associated customer ID and removes the customer ID(s) from the overall correlation output.

Outputting/Formatting

The system may then provide the information in a format such as a service facing interface, which can be used by further services in the chain for example, a checkout segmentation module which could be developed using the unique customer identification information. For example, the system may construct a data table that does not include any personal identifiable information for extended use according to a country's respective regulatory scheme.

Although the foregoing has been described with reference to certain specific embodiments, various modifications thereof will be apparent to those skilled in the art without departing from the scope of the claims appended hereto.

Numerous modifications and variations of the present disclosure are possible in light of the above teachings. It is therefore to be understood that within the scope of the appended claims, the disclosure may be practiced otherwise than as specifically described herein.

The invention claimed is:

1. A computer implemented method of outputting customer identifiers (IDs) to a memory based on stored data representing customer interactions involving use of an electronic device and an e-commerce system, the method comprising:
  collecting evidence in a first database of the memory associated with a plurality of customer interactions with an e-commerce system from a plurality of source databases aggregated from a plurality of merchants, the evidence associated with a given customer interaction comprising a respective data item for each of at least one of a plurality of evidence types to be used for correlation;
  performing evidence standardization to produce standardized evidence that satisfies a common standard, such that following standardization, standardized data items of a given evidence type are directly comparable;
  filtering the standardized evidence from the first database to remove evidence to be excluded from data correlation according to a filtering criteria or filtering method and storing the standardized evidence remaining after filtering to a second database of the memory;
  performing correlation on the standardized evidence remaining after filtering based on data items of the plurality of evidence types to be used for correlation to determine each set of a plurality of sets of correlated evidence, by:

including in the set of the plurality of sets of correlated evidence, from the evidence associated with a first customer interaction of said plurality of customer interactions, all standardized data items of the plurality of evidence types to be used for correlation that exist in the evidence associated with the first customer interaction;

including in the set of the plurality of sets of correlated evidence, from the evidence associated with each other customer interaction of said plurality of customer interactions that is linked to evidence associated with the first customer interaction, all standardized data items of the plurality of evidence types to be used for correlation that exist in the evidence associated with the other customer interaction;

wherein evidence associated with one customer interaction of said plurality of customer interactions is linked to evidence associated with another customer interaction of said plurality of customer interactions:

where for at least one of the plurality of evidence types to be used for correlation, the standardized data item(s) of the at least one of the plurality of evidence types of the another customer interaction match at least one respective data item of the at least one of the plurality of evidence types of the one customer interaction, the method further comprising comparing standardized data item(s) of the another customer action with the standardized data item(s) of the one customer interaction to determine if the standardized data item(s) of the at least one of the plurality of evidence types of the another customer interaction match at least one respective standardized data item of the at least one of the plurality of evidence types of the one customer interaction; and where for at least one of the plurality of evidence types to be used for correlation, the standardized data item(s) of the at least one of the plurality of evidence types of the another customer interaction match the standardized data item(s) of the at least one of the plurality of evidence types of a customer interaction for which evidence associated with the customer interaction is already linked to evidence associated with the one customer interaction, the method further comprising comparing standardized data item(s) of the another customer interaction with the standardized data item(s) of the customer interaction for which evidence associated with the customer interaction is already linked to evidence associated with the one customer interaction;

after performing the correlation, associating each set of correlated evidence with a respective unique customer ID; and outputting each customer ID and the set of correlated evidence associated with the customer ID in a third database of the memory.

2. The method of claim 1 further comprising:
receiving an input identifying specific evidence associated with the customers to be excluded;
removing the customer ID(s) associated with the specific evidence.

3. The method of claim 1 wherein filtering the evidence comprises:
for at least one type of evidence:
counting instances of each specific value of the type of evidence;
where a number of instances of a specific value of the type of evidence is greater than a threshold, removing that specific value such that it does not remain after filtering.

4. The method of claim 3 further comprising:
configuring a respective threshold for each of at least two types of evidence.

5. The method of claim 1 wherein:
filtering the evidence comprises performing a data centrality analysis.

6. The method of claim 1 wherein filtering the evidence comprises removing any evidence matching an entry on a blacklist and/or keeping any evidence matching an entry on a whitelist.

7. The method of claim 1 further comprising:
receiving an input configuring the filtering.

8. The method of claim 7, wherein the input configures the filtering to perform a selected one of:
Threshold based evidence filtering;
Centrality analysis based evidence filtering;
Blacklist based evidence filtering;
Whitelist based evidence filtering.

9. The method of claim 1 wherein collecting evidence comprises collecting evidence associated with transactions with a single merchant through one or multiple channels.

10. The method of claim 1 wherein collecting evidence comprises collecting evidence associated with transactions with any one of a plurality of merchants through one or multiple channels.

11. A computer system configured for outputting customer identifiers (IDs) to a memory based on customer interactions involving use of an electronic device and an e-commerce system, the computer system comprising:
a processor; and
a computer readable storage medium storing computer executable instructions that when executed by the processor cause the computer to perform a method comprising:
collect evidence in a first database of the memory associated with a plurality of customer interactions with the e-commerce system from a plurality of source databases aggregated from a plurality of merchants, the evidence associated with a given customer interaction comprising a respective data item for each of at least one of a plurality of evidence types to be used for correlation;
performing evidence standardization to produce standardized evidence that satisfies a common standard, such that following standardization, standardized data items of a given evidence type are directly comparable;
filter the standardized evidence from the first database to remove evidence to be excluded from data correlation according to a filtering criteria or filtering method and storing the standardized evidence remaining after filtering to a second database;
perform correlation on the standardized evidence remaining after filtering based on data items of the plurality of evidence types to be used for correlation to determine a plurality of sets of correlated evidence, by:
including in the set of correlated evidence, from the evidence associated with a first customer interaction of said plurality of customer interactions, all data items of the plurality of evidence types to be used for correlation that exist in the evidence associated with the first customer interaction;

including in the set of correlated evidence, from the evidence associated with each other customer interaction of said plurality of customer interactions that is linked to evidence associated with the first customer interaction, all standardized data items of the plurality of evidence types to be used for correlation that exist in the evidence associated with the other customer interaction;

wherein evidence associated with one customer interaction of said plurality of customer interactions is linked to evidence associated with another customer interaction of said plurality of customer interactions:

where for at least one of the plurality of evidence types to be used for correlation, the standardized data item(s) of the at least one of the plurality of evidence types of the another customer interaction match at least one respective standardized data item of the at least one of the plurality of evidence types of the one customer interaction, the method further comprising comparing standardized data item(s) of the another customer action with the standardized data item(s) of the one customer interaction to determine if the standardized data item(s) of the at least one of the plurality of evidence types of the another customer interaction match at least one respective standardized data item of the at least one of the plurality of evidence types of the one customer interaction; and where for at least one of the plurality of evidence types to be used for correlation, the standardized data item(s) of the at least one of the plurality of evidence types of the another customer interaction match the standardized data item(s) of the at least one of the plurality of evidence types of a customer interaction for which evidence associated with the customer interaction is already linked to evidence associated with the one customer interaction, the method further comprising comparing standardized data item(s) of the another customer interaction with the standardized data item(s) of the customer interaction for which evidence associated with the customer interaction is already linked to evidence associated with the one customer interaction;

after performing correlation on the evidence remaining after filtering, associate each set of correlated evidence with a respective unique customer ID; and output each customer ID and the set of correlated evidence associated with the customer ID in a third database in the memory.

12. The system of claim 11 further configured to detect customer interactions with the e-commerce system.

13. The system of claim 11 further configured to:
receive an input identifying specific evidence associated with the customers to be excluded;
remove the customer ID(s) associated with the specific evidence.

14. The system of claim 11 wherein further configured to filter the evidence by:
for at least one type of evidence:
counting instances of each specific value of the type of evidence;
where a number of instances of a specific value of the type of evidence is greater than a threshold, removing that specific value such that it does not remain after filtering.

15. The system of claim 14 wherein a respective threshold is configured for each of at least two types of evidence.

16. The system of claim 11 further configured to filter the evidence by performing a data centrality analysis.

17. The system of claim 11 further configured to filter the evidence by removing any evidence matching an entry on a blacklist and/or keeping any evidence matching an entry on a whitelist.

18. The system of claim 11 further configured to receive an input configuring the filtering.

19. The system of claim 18, wherein the input configures the filtering to perform a selected one of:
Threshold based evidence filtering;
Centrality analysis based evidence filtering;
Blacklist based evidence filtering;
Whitelist based evidence filtering.

20. The system of claim 11 configured to collect evidence associated with transactions with a single merchant through one or multiple channels.

21. The system of claim 11 configured to collect evidence associated with transactions with any one of a plurality of merchants through one or multiple channels.

\* \* \* \* \*